UNITED STATES PATENT OFFICE.

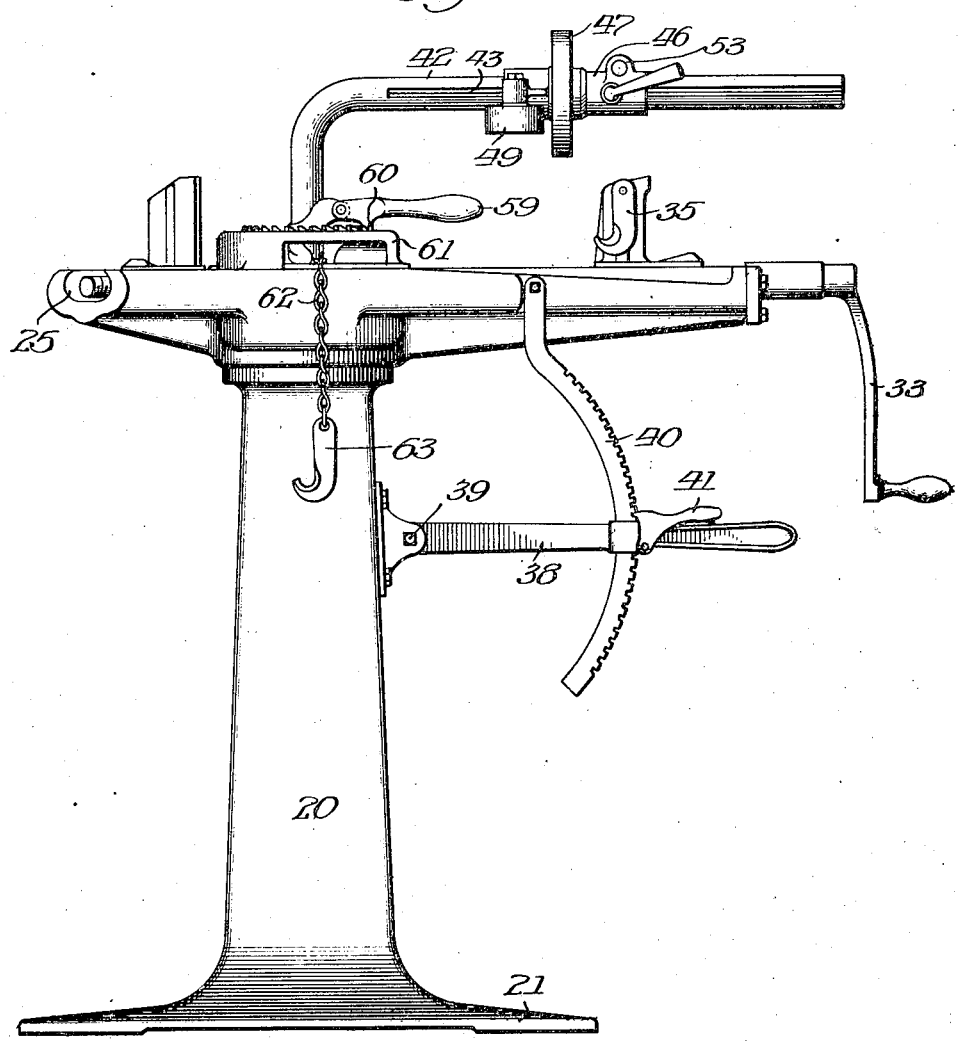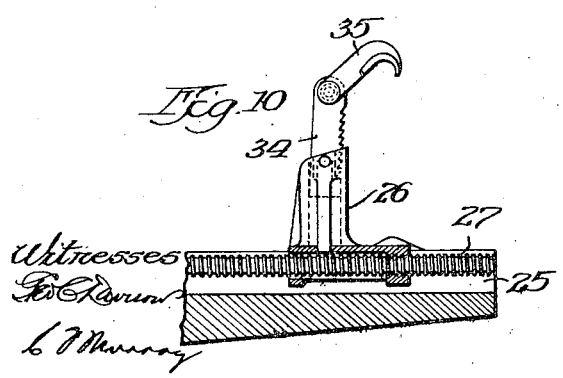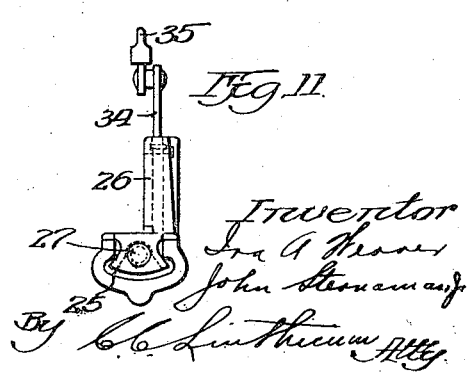

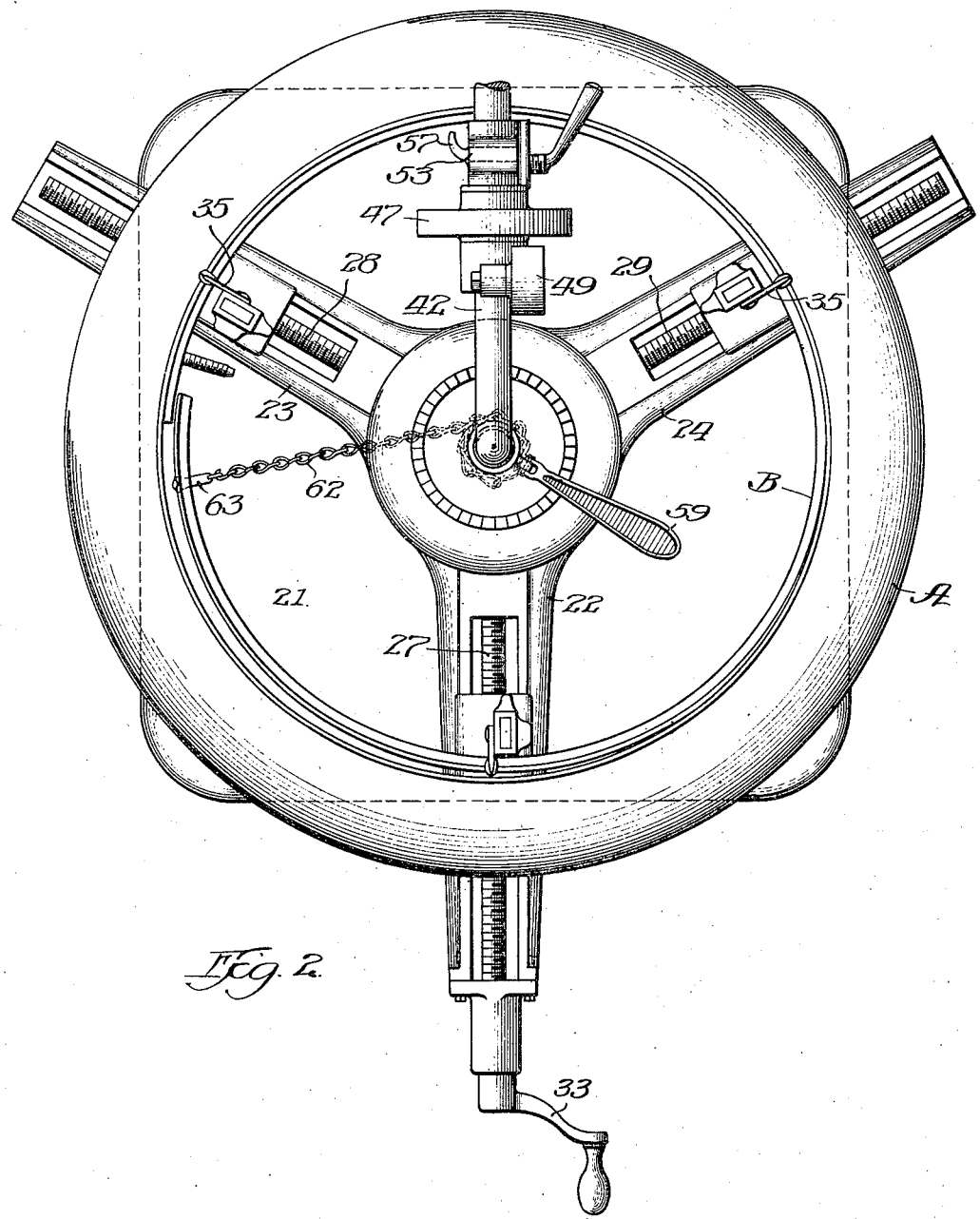

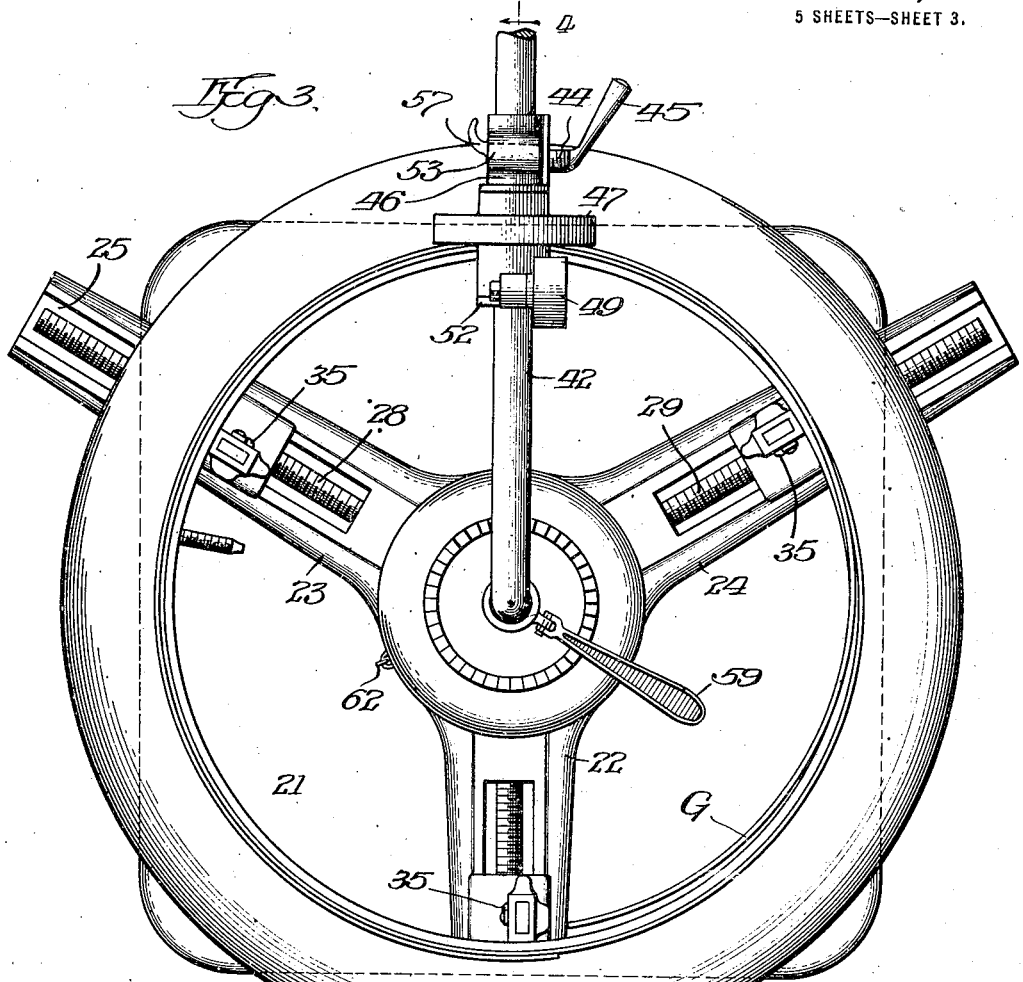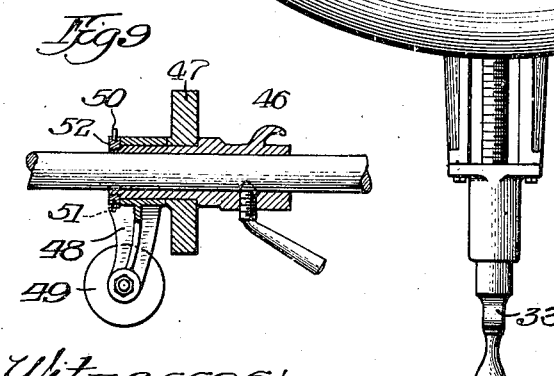

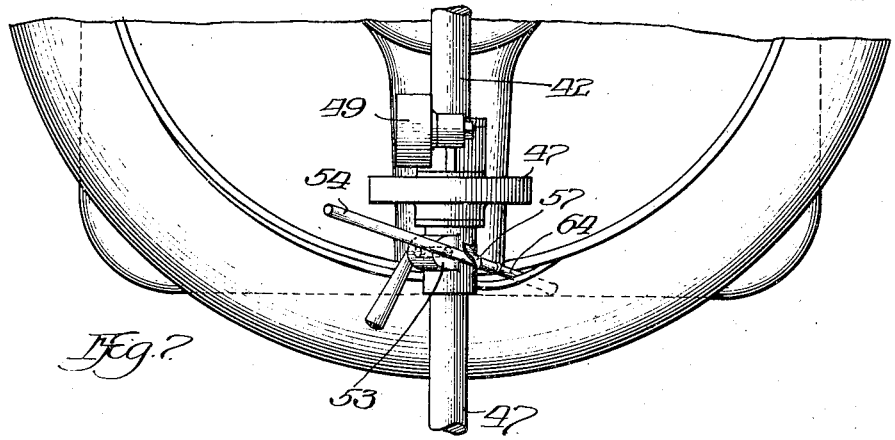
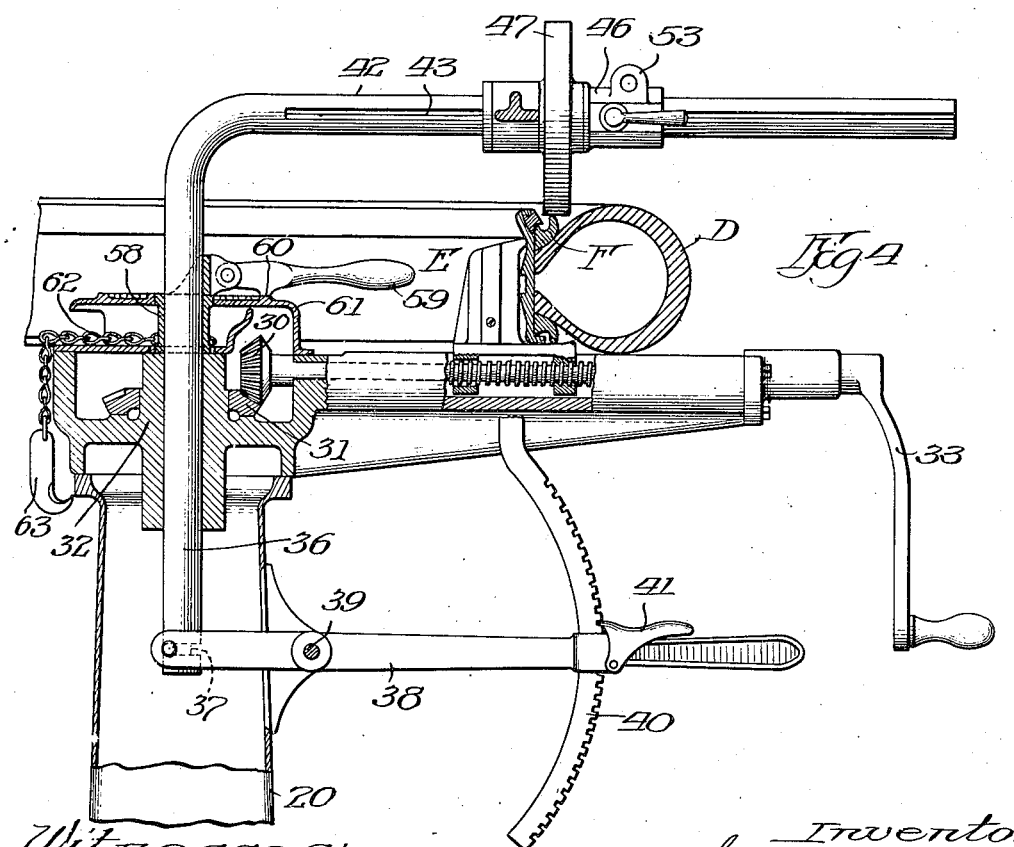

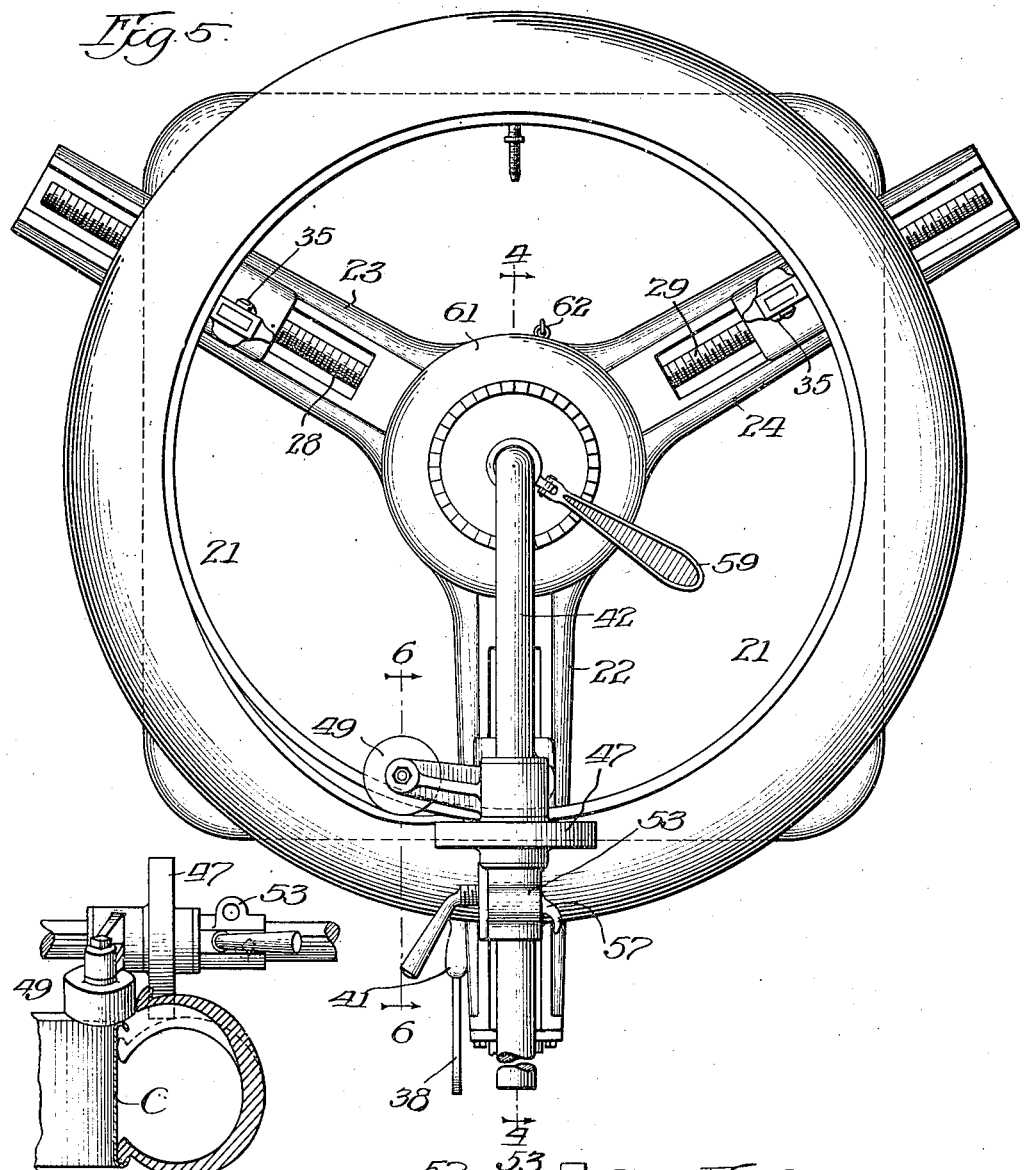

IRA A. WEAVER AND JOHN STERNAMAN, JR., OF SPRINGFIELD, ILLINOIS, ASSIGNORS TO WEAVER MANUFACTURING COMPANY, OF SPRINGFIELD, ILLINOIS, A CORPORATION OF ILLINOIS.

TIRE-CHANGING MACHINE.

1,341,726.        Specification of Letters Patent.      Patented June 1, 1920.

Application filed October 6, 1916. Serial No. 124,011.

*To all whom it may concern:*

Be it known that we, IRA A. WEAVER and JOHN STERNAMAN, Jr., citizens of the United States, and residents of Springfield, in the county of Sangamon and State of Illinois, have invented certain new and useful Improvements in Tire-Changing Machines, of which the following is a specification.

Our invention relates to a machine adapted for use in the manipulation of rims and tires in order to assemble or disassociate the same, the object being to reduce the labor and eliminate the difficulties of manual manipulation.

A machine of the character described should have the capability of adapting itself to all types of rims and wheels employing pneumatic tires; that is to say, a machine to be of practical use must be capable of handling all the styles of rims commonly employed at the present time. To this end we have designed a machine to combine the elements of simplicity and adaptability to the different uses required thereof.

The invention will be more readily understood by reference to the accompanying drawings, wherein—

Figure 1 is a side elevation of a tire changing machine such as contemplated by us;

Fig. 2 is a plan view thereof, showing a tire and rim in place, the parts being in the position necessary to cause the manipulation of a split rim and the contraction of the same;

Fig. 3 is a view similar to Fig. 2, showing the arrangement of parts necessary to effect the assembling of the parts of a rim which employs a split locking ring;

Fig. 4 is a sectional view on the line 4—4 of Fig. 3;

Fig. 5 is a plan view, illustrating an operation such as is necessary to effect the assembling of a clencher tire and rim;

Fig. 6 is a sectional view on the line 6—6 of Fig. 5;

Fig. 7. is a fragmentary plan view showing the arrangement of parts necessary to effect the separation of a clencher tire and rim;

Fig. 8 is an enlarged fragmentary elevation showing the adaptation of the device to the removal of a tire from a rim;

Fig. 9 is a sectional view showing the method of mounting the rollers on the oscillating arm;

Fig. 10 is a longitudinal sectional view somewhat enlarged, showing one of the rim-engaging jaws;

Fig. 11 is an end elevation of the same.

Referring more particularly to the drawings, it will be seen that the invention comprises a hollow standard 20, having a base 21, and provided at its upper end with three radially extending arms 22, 23, 24, having undercut ways or grooves 25 therein, as best shown in Figs. 10 and 11. Mounted within each of the grooves in the three radial arms is a jaw 26, the triangular lower portions of which occupy the undercut grooves in the radial arms and engage the threaded members 27, 28, 29. At the inner ends of the threaded members we provide beveled pinions 30, which engage with a bevel gear 31, mounted concentrically of the hub 32, which forms the center of the radial arms. At its outer end, the threaded member 27 is provided with a crank 33. It will be seen that by reason of this arrangement the jaws are manually actuated simultaneously and equally and that a rim clamped thereby is accurately centered with relation to the axis of the machine.

Mounted within the jaws 26 are vertically adjustable slides 34 having pivoted hook members 35 at their upper ends. One edge of the slide is toothed, as shown in Fig. 10, to provide for the retention of the slide in its vertically adjusted position. This adjustment is desirable to accommodate different widths of rims, the hook being employed to engage a rim when it is necessary to contract the same.

Mounted in a concentric vertical aperture in the hub 32 is a shaft or stem 36, the lower end of which is provided with a peripheral groove 37, Fig. 4, a forked lever 38, pivoted at 39 to the standard, engaging said shaft, and adapted to effect vertical reciprocation or adjustment thereof without interfering with its rotation. A notched sector 40, coöperating with a dog 41 on the lever, provides means for securing the same in adjusted position. At the upper end of the shaft 36 and angularly disposed with relation thereto is a radial arm 42, the length of which is somewhat greater than that of the arms 22, 23, 24, the extreme outer end of the arm serving as a handle to be engaged by the operator. In the present instance the arm 42 and shaft 36 are integral; that is, they are formed from a single rod which is bent at a right angle. The arm 42 is provided with a groove 43, which is engaged by an adjusting screw 44, to the outer end of which is secured a handle 45. The adjusting screw is carried by a sleeve 46, which is longitudinally slidable upon the arm 42 and the details of which are best shown in Fig. 9. Mounted upon the sleeve and concentrically disposed therewith is a roller 47; that is to say, the roller surrounds both the sleeve and the arm 42. Also mounted on the sleeve is a short arm 48, having a small roller 49 pivoted in the end thereof. This roller is mounted for oscillation on the sleeve in a path limited by the stops 50, 51, on a holding or locking nut 52. The function of the two rollers 47, 49, will be described hereinafter. Near the upper outer end portion of the sleeve we provide an apertured ear 53, which serves to accommodate the lateral shank 54ᵃ of a tool 54, best shown in Fig. 7 in one instance, or the bent end of a tool 55, having the roller 56 upon the lower end thereof, in another instance. Alongside the sleeve and beneath the apertured lug referred to is a bent lug or hook 57, best shown in Fig. 7, intended for coöperation with the tool 54 to prevent the dislocation of the same when in the process of displacing the bead portion of a tire casing from a clencher rim.

As is illustrated in Fig. 4, we provide a sleeve 58, which surrounds the vertical shaft 36 and rests upon the hub 32, and to the upper end of this sleeve is secured an operating handle 59, having a dog or tooth 60 coöperating with the notched upper face of a plate or cover 61. Secured to the sleeve 58 is a chain 62, to the outer end of which is fastened a hook 63, the function of which in contracting the rim is best shown in Fig. 2.

The operation of the appliance is as follows:

Assuming that the parts are in the positions shown in Fig. 1, and that it is desired to remove a tire casing from a transversely split rim, the casing and the rim, which we have designated as A, B, respectively, in Fig. 2, are placed on the machine resting on the three stationary arms 22, 23, and 24, the hooks 35 having been swung over into engagement with the rim and the hook 63 brought into coöperative relation with the rim near the joint therein. Thereupon the handle or lever 59 is rotated to wind up the chain to a sufficient extent to displace or off-set the ends of the rim. The crank 33 is then turned to retract or draw inwardly the jaws 26. This causes a contraction of the split rim to an extent sufficient to permit of the ready detachment of the casing or tire therefrom. After the necessary repairs or replacements have been made, the casing is returned to the position of Fig. 2 and the crank 33 rotated in the opposite direction, the jaws 26 moving radially outwardly, forcing or expanding the rim into proper operative position, whereupon its two ends may be locked together in the usual way. In the operation just described, the arm 42 and its associated parts are not utilized.

The tire casing may be removed from a split rim by the use of this apparatus in a somewhat different and more expeditious manner. The rim and its casing are laid on the device in the usual way and the jaws 26 adjusted. Then the joint is broken by means of the chain 62 and its associated hook 63, as described, whereupon the operator lifts the other or free end of the rim, bringing the rim as a whole into general spiral shape from which the tire can be readily removed in the usual spiral fashion. This spiral method of taking off the casing causes the rust to break loose easily and the operation is quicker than to continue contracting the rim, the latter method being likely to spring or detrimentally set the rim, especially where excessive contraction is necessary by reason of a long valve stem projecting inwardly through the rim near its joint.

Assuming now, that it is desired to remove a tire casing from an unsplit or continuous clencher rim, such as indicated in cross-section at C in Fig. 6, the tool 54, desirably equipped on its lower end with an antifriction roller 64, is inserted between both bead portions of the casing and the rim. Any other suitable tool may be employed if found convenient to assist in forcing the casing away from the rim to permit such introduction of the tool 54. Then the lateral part 54ᵃ projecting sidewise from the body of the tool 54, is inserted in the socket of ear 53, thus operatively connecting the tool and arm 42, (Fig. 7), the former being held from displacement or dislodgment by engaging the projection or hook 57. The height of the arm 42 may be regulated or adjusted as may be necessary to permit the performance of these operations. Arm 42 is now swung around the axis of the shaft 36 as will be readily understood and during this movement the tool 54 lifts and frees the entire casing from the rim, this action, of course, occurring progressively during the movement of the arm.

To replace the tire casing on a clencher rim of this type, the parts of the mechanism are caused to coöperate in the manner indicated in Figs. 5 and 6. The roller 49 engages either one or both bead portions of the casing and progressively stretches it outwardly over the clencher part of the rim. Roller 47 by engagement with the side of the casing presses such stretched portion downwardly, causing it to become properly seated in the rim. Thus, as the arm 42 is swung around, these coacting rollers gradually and progressively apply successive portions of the casing to the rim, the completion of which operation is effected when the arm has made a full circular movement. The proper height for these rollers to do their work is controlled by handle 38, and, of course, the rim is held rigidly during this casing and applying operation by the jaws 26.

Assuming that either a straight side or clencher tire casing D (Fig. 4), is to be removed from a so-called "quick-detachable" rim E of the general type shown in this figure, having a split locking ring accommodated in a groove of the rim, roller 47 is adjusted to proper position on the revoluble radial arm 42 and the height of the latter is regulated for the proper performance of the work to be done, that is to say, as the arm is revolved roller 47 depresses the upper part of the deflated casing D by pressing down the ring flange F, thus progressively freeing the successive portions of the locking ring G which can be readily removed. This locking ring is shown partly detached in Fig. 3. In this operation the other roller 49 performs no function and may be swung up out of the way, as indicated in Fig. 3.

In case a tire casing or shoe is to be applied to such a rim, the roller 47 may, by engagement with both the flange ring F and the locking ring G facilitate the application of the tire, such roller progressively depressing the flange ring to permit the locking ring to enter its groove in the rim in which it is pressed laterally fully home by the roller.

As the travel of the roller proceeds, the flange springs back, thus overlapping the locking ring and holding it in place in its groove.

Not infrequently a casing adheres to or becomes vulcanized on a rim and the tool shown in Fig. 8 is adapted to the displacement thereof. In such figure the bent or curved tool 55 is shown as occupying the aperture in the lug 53 and the conical roller 56 at the lower end of the tool is freeing the casing from the rim by a lifting action during its rotation about the axis of shaft 36. As a means for preventing the catching or tearing of the casing or the flap in the split locking ring groove of a rim of this sort, we may temporarily provide a filler piece 65 of suitable shape. It will be noted that the pivot point of the tool is inside of the point of engagement of the roller 56 with the tire and, furthermore, that the mounting of the roller is such that it is inclined with relation to the flat inner face of the rim. This disposition of the roller tends to cause it to hug the face of the tire closely while forcing the tire upwardly, thus not damaging the casing.

Obviously, the illustrations as to the adaptability of the device are incomplete, as it may be employed in a different manner, all without departure from the spirit of our invention. It will be understood further that with slight modifications, the appliance may be utilized for the holding and manipulation of wire wheels in the attachment of casings thereto and their removal therefrom. The modifications which will readily suggest themselves to those skilled in the art are considered to be within the spirit of our invention.

Various features of novelty and improvement illustrated in the drawing of this application and described above are claimed in our co-pending application, Serial No. 278,234, Tire changing appliances, filed February 20, 1919 constituting a division of the present application.

We claim:

1. In a tire and rim manipulating device of the character described, the combination of a support, means on said support to center and fixedly hold a vehicle-wheel rim, means to operate said centering and holding means, a radial arm mounted on said support for rotation about the axis of the centered rim, means for adjusting the height of said arm, and one or more tools carried by said arm, substantially as described.

2. In a tire and rim manipulating device of the character described, the combination of a support, means on said support to center and fixedly hold a vehicle-wheel rim in a substantially-horizontal plane, means to operate said centering and holding means, a vertical shaft mounted in said support concentric with the centered rim, means to vertically adjust said shaft, an arm projecting laterally from the upper portion of said shaft adapted for rotation in a plane above the centered rim, and one or more rollers adjustably mounted on said arm, substantially as described.

3. In a tire and rim manipulating device of the character described, the combination of a support, means on said support to center and fixedly hold a vehicle-wheel rim, means to operate said centering and holding means, a radial arm mounted on said support for rotation about the axis of the centered rim, means for adjusting the height of said arm toward and from the plane of the rim, a swinging arm rockingly mounted on said radial arm, and a roller carried by said swinging arm, substantially as described.

4. In a tire and rim manipulating device of the character described, the combination of a support, means on said support to center and fixedly hold a vehicle-wheel rim, means to operate said centering and holding means, a radial arm mounted on said support for rotation about the axis of the centered rim, means for adjusting the height of said arm toward and from the plane of the rim, a sleeve slidingly adjustable on said radial arm, a swinging arm rockingly mounted on said sleeve, and a roller mounted on said swinging arm, substantially as described.

5. In a tire and rim manipulating device of the character described, the combination of a support, means on said support to center and fixedly hold a vehicle-wheel rim in a substantially-horizontal plane, means to operate said centering and holding means, a vertical shaft mounted on said support concentric with the centered rim, means to vertically adjust said shaft, a radial arm projecting laterally from the upper portion of said shaft adapted for rotation in a plane above the centered rim, a sleeve splined on said radial arm, means for clamping said sleeve in various adjusted positions lengthwise said radial arm, a roller on said sleeve, a swinging arm rockingly mounted on said sleeve, and a second roller carried by said swinging arm, substantially as described.

6. In a tire-changing appliance of the character described, the combination of a support, a plurality of radially movable jaws adapted to engage and hold a vehicle-wheel rim, means to operate said jaws, a radial arm mounted for rotation about the axis of said rim, means for adjusting the height of said arm, one or more tools carried by said arm and adapted to act during the rotation of the latter, said height adjusting means including a lever pivoted to said support, and a notched segment with which said lever engages, substantially as described.

7. In a tire and rim manipulating device of the character described, the combination of a support, means on said support to center and fixedly hold a vehicle-wheel rim in a substantially horizontal plane, means to operate said centering and holding means, a vertical shaft mounted in said support concentric with the centered rim, a radial arm projecting laterally from the upper portion of said shaft adapted for rotation in a plane above the centered rim, one or more tools carried by said radial arm and adapted to act during the rotation of the latter, and means to vertically adjust the height of said shaft and its radial arm including a lever pivoted to said support and a notched segment with which said lever engages, substantially as described.

Signed at Springfield, Illinois, this 31st day of July, 1916.

IRA A. WEAVER.
JOHN STERNAMAN, Jr.

Witnesses:
H. A. JABUSCH,
R. C. BENNETT.